US009146122B2

(12) United States Patent
Ellanti et al.

(10) Patent No.: US 9,146,122 B2
(45) Date of Patent: Sep. 29, 2015

(54) NAVIGATION SYSTEM WITH AUDIO MONITORING MECHANISM AND METHOD OF OPERATION THEREOF

(75) Inventors: Manohar Ellanti, Fremont, CA (US); Salman Dhanani, Mountain View, CA (US)

(73) Assignee: TELENAV INC., Sunnyvale, CA (US)

( * ) Notice: Subject to any disclaimer, the term of this patent is extended or adjusted under 35 U.S.C. 154(b) by 547 days.

(21) Appl. No.: 12/890,248

(22) Filed: Sep. 24, 2010

(65) Prior Publication Data

US 2012/0078508 A1    Mar. 29, 2012

(51) Int. Cl.
*G01C 21/26* (2006.01)
*G01C 21/36* (2006.01)

(52) U.S. Cl.
CPC .......... *G01C 21/3608* (2013.01); *G01C 21/362* (2013.01)

(58) Field of Classification Search
CPC combination set(s) only.
See application file for complete search history.

(56) References Cited

U.S. PATENT DOCUMENTS

| 5,708,478 | A | 1/1998 | Tognazzini |
| 5,991,737 | A | 11/1999 | Chen |
| 6,208,932 | B1 * | 3/2001 | Ohmura et al. ............... 701/538 |
| 6,628,928 | B1 | 9/2003 | Crosby et al. |
| 6,957,041 | B2 | 10/2005 | Christensen et al. |
| 7,096,185 | B2 * | 8/2006 | Reichardt et al. ............. 704/275 |
| 7,120,921 | B1 | 10/2006 | Ito |
| 7,184,744 | B1 * | 2/2007 | Schnabel .................. 455/404.2 |
| 7,302,243 | B2 | 11/2007 | Tarbouriech |
| 7,729,478 | B1 | 6/2010 | Coughlan et al. |
| 8,155,280 | B1 * | 4/2012 | Or-Bach et al. ............ 379/88.13 |
| 8,566,885 | B2 * | 10/2013 | Hejna, Jr. ........................ 725/90 |
| 8,676,273 | B1 * | 3/2014 | Fujisaki ........................ 455/567 |
| 2005/0271219 | A1 * | 12/2005 | Bruelle-Drews ................ 381/86 |
| 2006/0123053 | A1 | 6/2006 | Scannell, Jr. |
| 2006/0282465 | A1 | 12/2006 | Sharma |
| 2007/0005368 | A1 * | 1/2007 | Chutorash et al. ............ 704/275 |
| 2007/0173266 | A1 * | 7/2007 | Barnes, Jr. ................. 455/456.1 |
| 2008/0091643 | A1 * | 4/2008 | Malik ................. 707/2 |
| 2008/0141180 | A1 * | 6/2008 | Reed et al. ..................... 715/854 |
| 2008/0165984 | A1 * | 7/2008 | Yun et al. ........................ 381/86 |
| 2008/0177541 | A1 * | 7/2008 | Satomura ..................... 704/251 |
| 2008/0215240 | A1 * | 9/2008 | Howard et al. ............... 701/213 |
| 2008/0235017 | A1 * | 9/2008 | Satomura ..................... 704/246 |
| 2008/0300775 | A1 * | 12/2008 | Habaguchi .................... 701/116 |
| 2009/0024322 | A1 * | 1/2009 | Tomita et al. ................. 701/211 |
| 2009/0052635 | A1 * | 2/2009 | Jones et al. ................. 379/88.02 |
| 2009/0070797 | A1 | 3/2009 | Ramaswamy et al. |
| 2009/0112605 | A1 * | 4/2009 | Gupta ........................... 704/275 |
| 2009/0187463 | A1 | 7/2009 | DaCosta |
| 2009/0240427 | A1 * | 9/2009 | Siereveld et al. ............ 701/201 |
| 2009/0298529 | A1 | 12/2009 | Mahajan |

(Continued)

FOREIGN PATENT DOCUMENTS

WO    2009143871 A1    12/2009

OTHER PUBLICATIONS

International Search Report for PCT Application No. PCT/US2011/041693 dated Oct. 28, 2011.

*Primary Examiner* — Jonathan L Sample
(74) *Attorney, Agent, or Firm* — IP Investment Law Group

(57) ABSTRACT

A method of operation of a navigation system includes: monitoring an audio source; capturing an audio segment from the audio source; converting the audio segment into a text segment; parsing the text segment for an information segment; and performing a guidance function based on the information segment for displaying on a device.

20 Claims, 5 Drawing Sheets

(56) References Cited

U.S. PATENT DOCUMENTS

| | | |
|---|---|---|
| 2009/0306891 A1* | 12/2009 | Jeon et al. ..................... 701/209 |
| 2009/0306989 A1* | 12/2009 | Kaji .............................. 704/270 |
| 2009/0316671 A1 | 12/2009 | Rolf et al. |
| 2009/0326936 A1* | 12/2009 | Nagashima .................. 704/235 |
| 2010/0079338 A1 | 4/2010 | Wooden et al. |
| 2010/0097239 A1* | 4/2010 | Campbell et al. ........ 340/825.25 |
| 2010/0205530 A1* | 8/2010 | Butin et al. .................... 715/715 |
| 2011/0093189 A1* | 4/2011 | Odinak et al. ................ 701/201 |
| 2012/0078508 A1* | 3/2012 | Ellanti et al. .................. 701/419 |

* cited by examiner

NAVIGATION SYSTEM WITH AUDIO MONITORING MECHANISM AND METHOD OF OPERATION THEREOF

TECHNICAL FIELD

The present invention relates generally to a navigation system, and more particularly to a navigation system with audio monitoring.

BACKGROUND ART

The ability of users to receive and consume information has been bolstered by rapid advances in consumer electronics, such as music players, digital camera, personal digital assistants (PDA), cellular phones, and notebooks. These advances have allowed users the ability to create, transfer, store, and consume information almost anywhere, anytime.

Navigation systems and location based services enabled systems have also become more portable and powerful. These systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available, as well.

Current personal navigation devices can display navigation information on a screen, such as: the location co-ordinates of the device at; the speed of the device; and the direction of movement of the device. While the navigation information can be displayed in any number of ways most users use a map mode, which causes a map to be displayed on the screen of the personal navigation device, indicating the location of the device on the map. However, users continue to look for ways to interact with navigation and location based devices.

Thus, a need still remains for a navigation system with audio monitoring capabilities. In view of the ever increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: monitoring an audio source; capturing an audio segment from the audio source; converting the audio segment into a text segment; parsing the text segment for an information segment; and performing a guidance function based on the information segment for displaying on a device.

The present invention provides a navigation system, including: a communications unit for monitoring an audio source; a storage unit, coupled to the communications unit, for capturing an audio segment from the audio source; and a control unit, coupled to the communications unit, for converting the audio source into a text segment, for parsing the text segment for an information segment, and for performing a guidance function based on the information segment.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
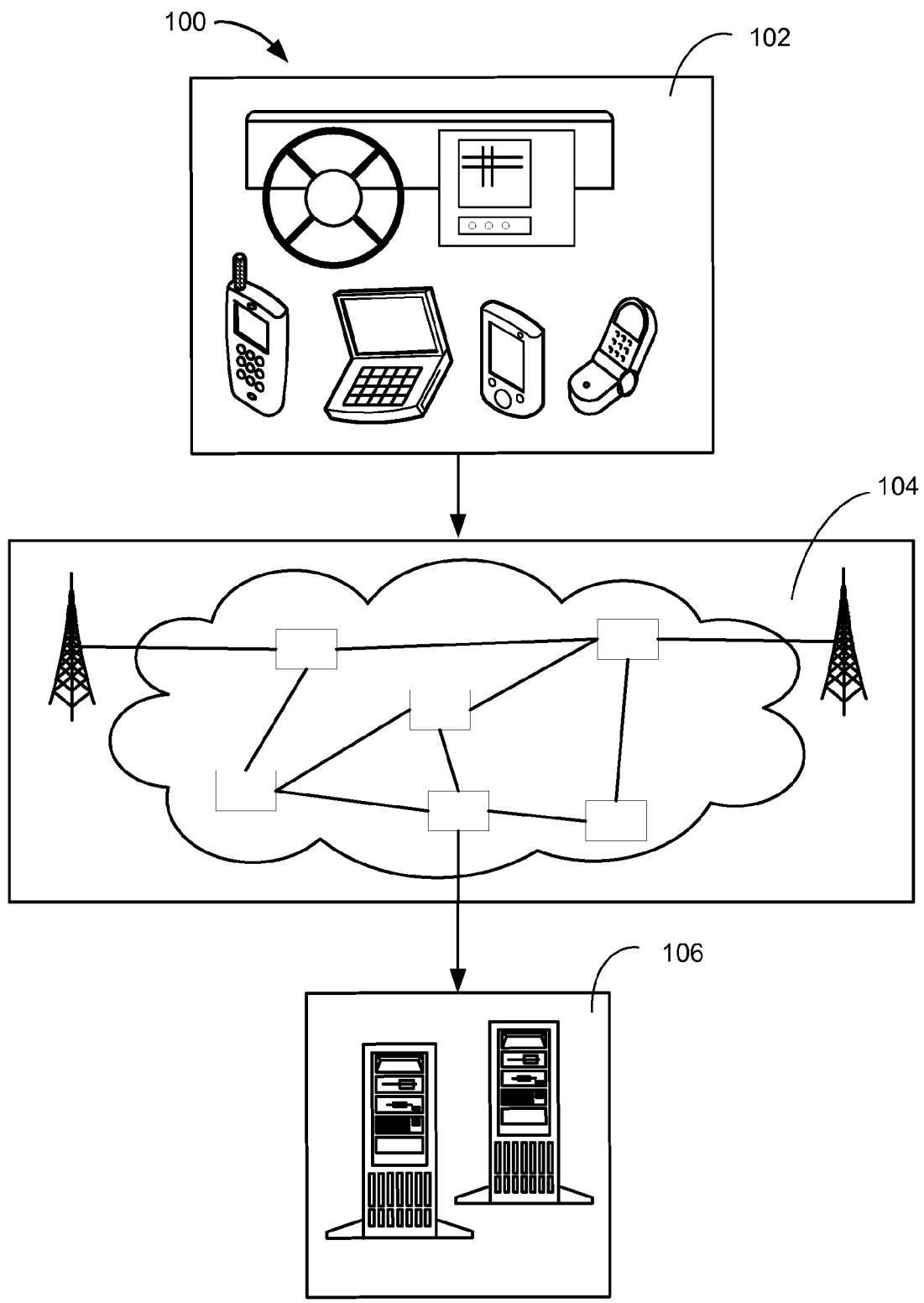
FIG. 1 is a navigation system with audio monitoring mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "guidance function" referred to herein comprises the operations carried out by the navigation system including both navigation functions and non-navigation functions. Examples of navigation functions include the provisions of turn-by-turn navigation, maps and route information or lane assistance. Examples of non-navigation functions include the deliverance movie times, enabling users to purchases products, or the provision of restaurant reviews.

The term "coupling" or "coupled" referred to herein can include any physical or non-physical connecting, joining or linking of a device, module, unit or element of the navigation system.

Referring now to FIG. 1, therein is shown a navigation system 100 with audio monitoring mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can connect to the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

Figure 2:
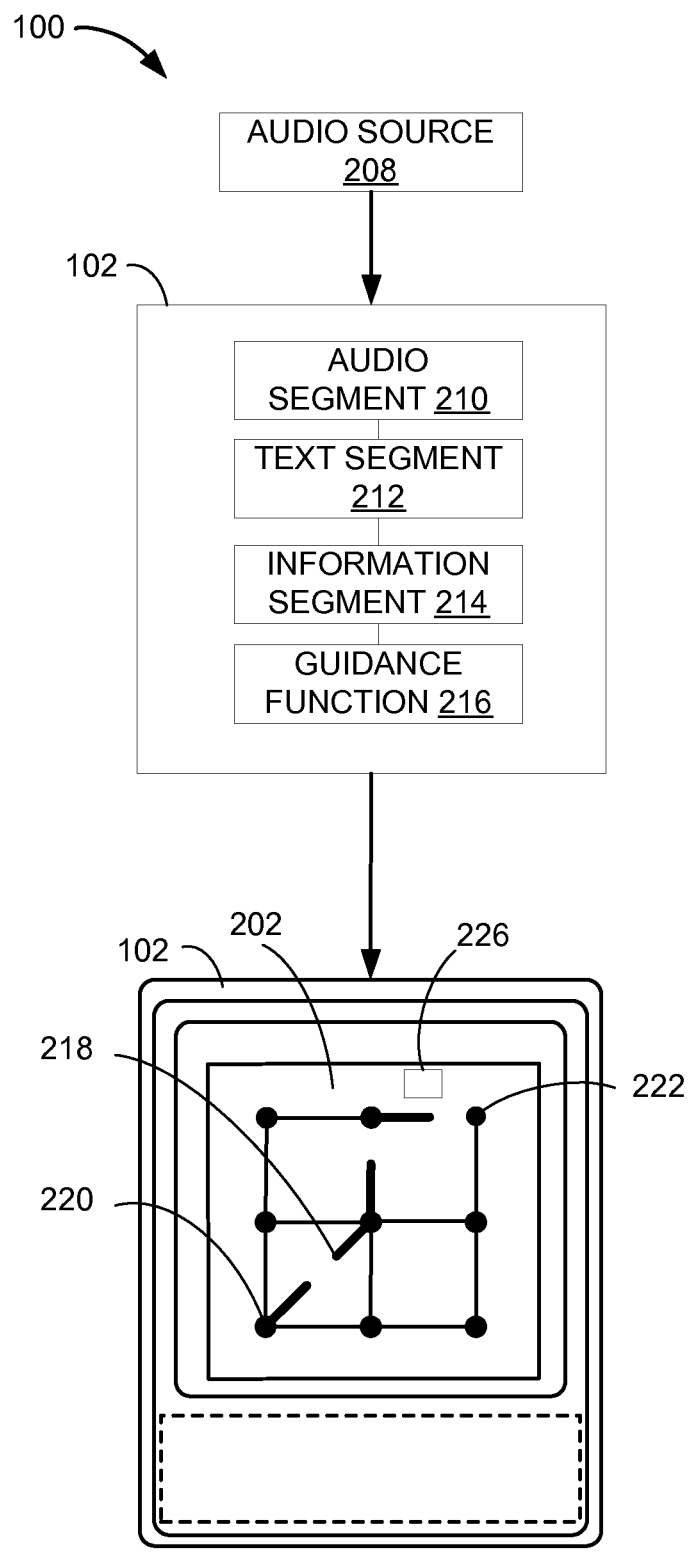
FIG. 2 is a display interface of the first device in an example of the navigation system.

Referring now to FIG. 2, therein is shown a display interface 202 of the first device 102 in an example of the navigation system 100. The navigation system 100 depicts the first device 102 monitoring an audio source 208. The audio source 208 is defined as a transmission of information that includes audio information received by the navigation system 100. The audio source 208 can be, for example, transmission from traditional radio, satellite radio, HD radio, television, or the internet. For illustrative purposes the first device 102 is shown as monitoring the audio source 208. It is understood, however, that the second device 106 of FIG. 1 can monitor the audio source 208 and can perform any of the functions performed by the first device 102 as described throughout the description of the present invention.

The audio source 208 can transmit an audio segment 210. The audio segment 210 is defined as a portion of the audio information including non-audible frequencies transmitted by the audio source 208. The first device 102 can process the audio segment 210. The first device 102 can use a conversion means such as a speech recognition means or a data conversion means to convert the audio segment 210 into a text segment 212. The text segment 212 is defined as a text version of at least a portion of the audio segment 208 or any audio information. The text segment 212 is in the form of alphanumeric characters, logograms or logographs, symbols, or a combination thereof. For example the first device 102 can convert an advertisement, a song, or a news story into the text segment 212.

The first device 102 can also parse the text segment 212 for an information segment 214. The information segment 214 is defined as predetermined information types or formats included in the text segment 212. The information segment 214 can include text or data that a user might wish to act upon, such as an address, a telephone number, a product name, a song same, an album name, a movie name, or a website. The information segment 214 can be made available for immediate use or it can be saved, for example, in a favorites list or a to-do list, for later action.

The first device 102 can also perform a guidance function 216 based on the information segment 214. The guidance function 216 provides navigation information for use, display, or a combination thereof by the first device 102. For example the first device 102 can perform the guidance function 216 such as navigating to a destination 222 mentioned in an advertisement or calling a number mentioned in an advertisement. The destination 222 is defined as a physical, virtual, or web location obtained from the information segment 214.

The display interface 202 can display a route 218 between a user location 220 and the destination 222. The route 218 is defined as a physical or virtual navigation guidance or direction from a starting location to a target location. The user location 220 is defined as a physical or virtual location for a user of the navigation system 100. The display interface 202 can also display information related to the audio segment 210, the text segment 212, or the information segment 214.

For example the display interface 202 can display the route 218 to the destination 222 that was contained in the information segment 214 or can display the destination 222 for multiple locations contained in the information segment 214. For illustrative purposes the route 218 is displayed on a grid, although, it is understood that the route 218 can be displayed as part of any number of visual representations, including street level maps, topographical maps, and satellite images.

The display interface 202 can display a reminder 226. The reminder 226 conveys information through a notification that the navigation system 100 is monitoring the audio source 208, is capturing the audio segment 210 from the audio source 208, is converting the audio segment 210 into the text segment 212, is parsing the text segment 212 for the information segment 214, or is ready to perform the guidance function 216 based on the information segment 214. For illustrative purposes the reminder 226 is shown in the upper right-hand section the display interface 202, although it is understood that the reminder 226 can be displayed anywhere on the display interface 202.

It has been discovered that the present invention provides the navigation system 100 that improves safe driving through improved usability of navigation guidance with interaction of broadcast information. The navigation system 100 can allow interactions with broadcast information by capturing the audio segment 210 from the audio source 208, converting it into the text segment 212 through a conversion means, and parsing the text segment 212 for the information segment 214 to be used to perform the guidance function 216. This allows the navigation system 100 to interact with broadcast information by performing the guidance function 216, such as turn-by-turn navigation or calling a phone number, based on the information segment 214 without diverting attention from safe vehicle operation.

Figure 3:
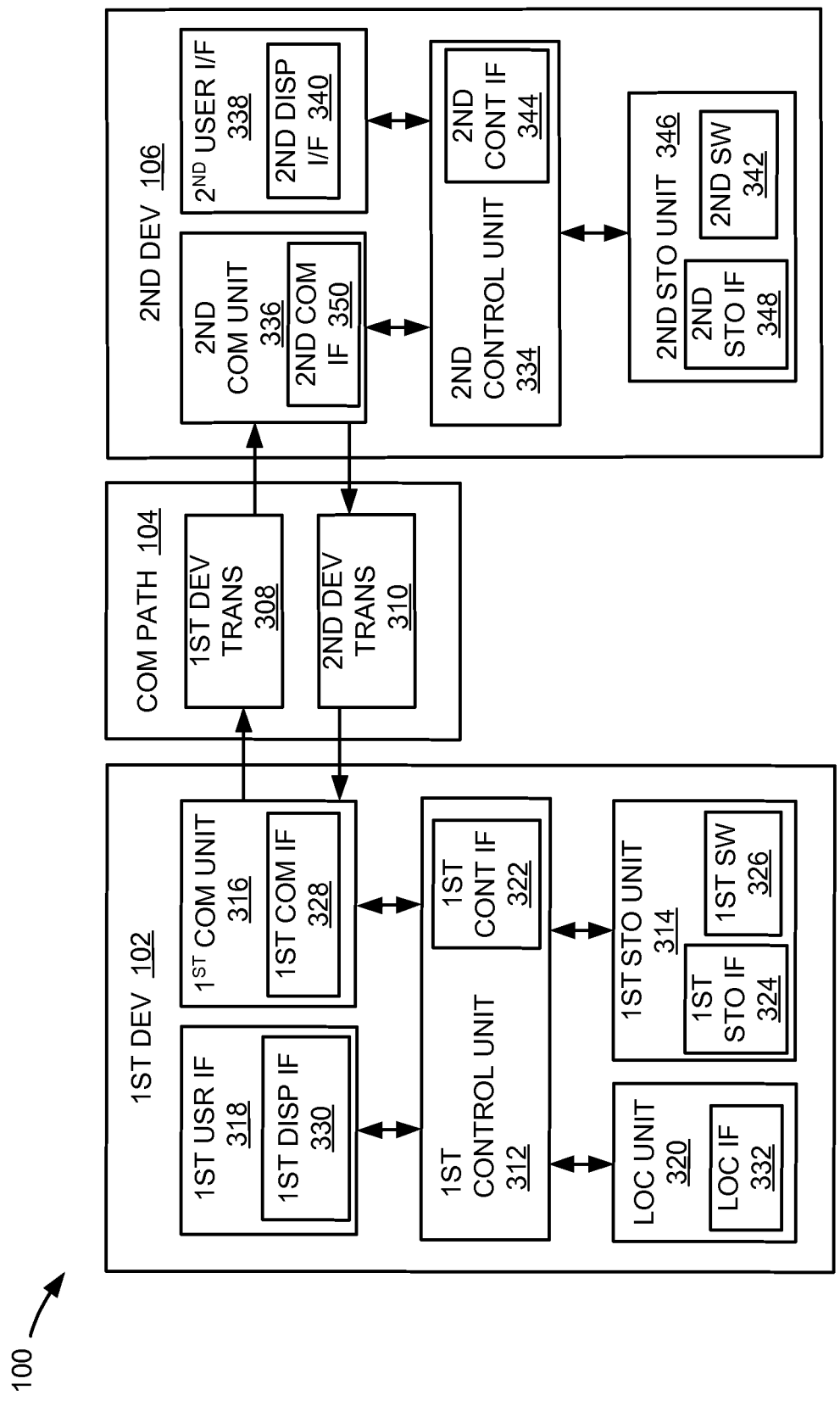
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
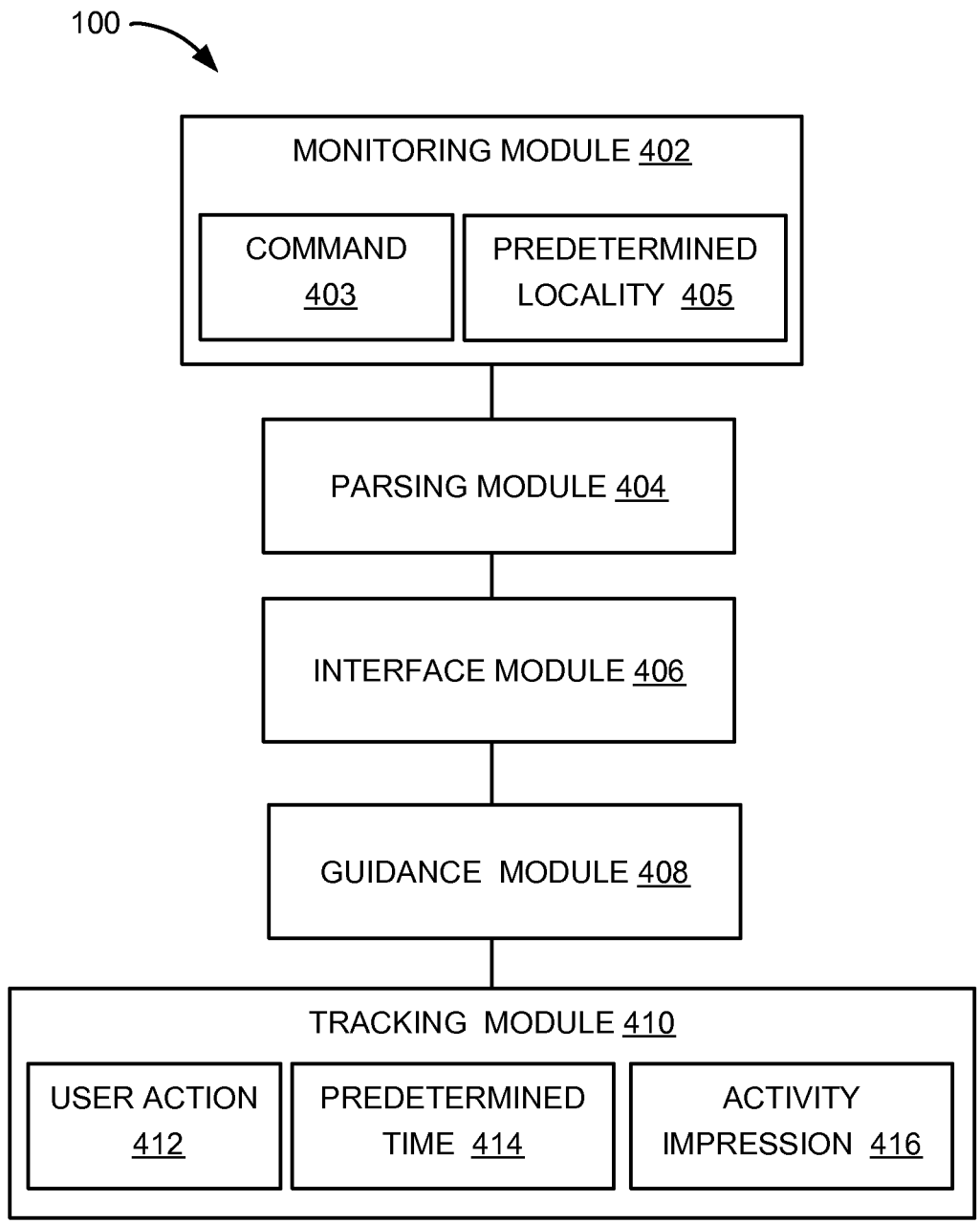
FIG. 4 is a control flow of the navigation system.

Referring now to FIG. 4, therein is shown a control flow of the navigation system 100. The navigation system 100 depicts a monitoring module 402. The monitoring module 402 monitors the audio source 208 of FIG. 2. The monitoring module 402 can monitor the audio source 208 by, for example, tuning to a specific frequency, channel, internet protocol (IP) address, or URL. The monitoring module 402 can constantly monitor the audio source 208 or it can begin and end monitoring based on a command 403 from a user (not shown). The command 403 is defined as a verbal or physical action by a user for operating the navigation system 100.

The monitoring module 402 can select to monitor transmissions from a predetermined locality 405 of the audio source 208. The predetermined locality 405 is defined as a selected geographic region from which to monitor the audio source 208.

For example, the monitoring module 402 can monitor transmission from local sources, such as local radio or television stations for the city, county, or state, as examples. The monitoring module 402 can monitor sources for localities for intended travel. If the monitoring module 402 detects the user of the navigation system 100 is traveling across the state or between states, the monitoring module 402 can select the audio source 208 for the localities along the trip or at the target destination locality and not just the current locality. The monitoring module 402 can receive non-local or future destination localities from the route 218 of FIG. 2 or from a user's calendar for future calendar events.

The monitoring module 402 can capture the audio segment 210 of FIG. 2 from the audio source 208 by saving a portion of the audio source 208 to a data storage device such as a hard drive, flash memory, or an optical disc. The audio segment 210 can be, for example, an advertisement, a song, or a news story. The monitoring module 402 can select the audio segment 210 through the use of, for example, time stamps or identification codes transmitted with the audio source 208 or an instruction from the user to select the audio segment 210.

As another example, the monitoring module 402 can also obtain and save the audio segment 210 based on the time at which the audio segment 210 was broadcast and the frequency or channel on which it was broadcast. For example, the user can request that the monitoring module 402 obtain the audio segment 210 played at 11:35 a.m. on FM 88.7. The monitoring module 402 can then form a communication link with the entity broadcasting at that frequency to obtain the audio segment 210 played at that time.

The monitoring module 402 can monitor the audio source 208 if the user is not operating the radio, for example, and can work in background mode without interaction from the user of the navigation system 100. The background mode is defined as an operation mode of the navigation system 100 where the monitoring module 402 operates without the user operating the device or instrument to listen to or interact with the audio source 208. The monitoring module 402 can also monitor the audio source 208 that is different than a radio station, for example, being listened to be the user of the navigation system 100.

The monitoring module 402 can be implemented, for example, by the first device 102 of FIG. 1. For example, the monitoring module 402 can be implemented with the first communication unit 316 of FIG. 3 or the second communication unit 336 of FIG. 3 monitoring the audio source 208 and communicating with the broadcaster. The first control unit 312 of FIG. 3 or the second control unit 334 of FIG. 3 can determine the audio segment 210 to save based on the audio source 208. The first storage unit 314 of FIG. 3 and the second storage unit 346 of FIG. 3 can save the audio segment 210. The first software 326 of FIG. 3 or the second software 342 of FIG. 3 can provide the intelligence for the monitoring module 402.

The navigation system 100 further depicts a parsing module 404, which converts the audio segment 210 saved by the monitoring module 402 into the text segment 212 of FIG. 2 and parses the information segment 214 of FIG. 2 from the text segment 212. The parsing module 404 can use a conversion means such as, a speech recognition means, or a data conversion means, to convert the audio segment 210 into the text segment 212. For example the parsing module 404 can convert an advertisement, a song, or a news story into the text segment 212.

The parsing module 404 can parse the text segment 212 for the information segment 214. The parsing module 404 can parse the text segment 212 by, for example, searching for predetermined information types and formats and by isolating key words, phrases, or strings of numbers. The information segment 214 can include text or data that a user might wish to act upon, such as an address, a telephone number, a product name, a song same, an album name, a movie name, or a website, all of which can be defined as the predetermined information types and formats. The information segment 214 can be made available for immediate use or it can be saved, for example, in a favorites list or a to-do list, for later action.

The parsing module 404 can be implemented, for example, by the first device 102, the second device 106, or distributed between the two. For example, the parsing module 404 can be implemented by the first control unit 312 or the second control unit 334 converting the audio segment 210 into the text segment 212. The first software 326 or the second software 342 operating in conjunction with the first control unit 312 or the second control unit 334 can provide the intelligence for the parsing module 404.

The navigation system 100 further depicts an interface module 406, which provides input and output functions for receiving and sending information or the command 403 for the navigation system 100, and selecting functions, applications, products, or services. The interface module 406 can receive, for example, the command 403 such as an instruction to perform the guidance function 216 of FIG. 2 extracted from the information segment 214, an instruction to save the audio segment 210, an instruction to share the information segment 214 or the audio segment 210 with another device, or an instruction to purchase a product based on the information segment 214.

As an example the interface module 406 can receive the command 403 to navigate a destination mentioned in an advertisement, for example, to the destination 222 of FIG. 2. The destination 222 can be, for example, "123 Kifer Road, Sunnyvale, Calif." which can be the information segment 214.

The interface module 406 can be implemented, for example, by the first device 102, the second device 106, or distributed between the two. As an example, the interface module 406 can be implemented by the first communication unit 316 of FIG. 3 or the second communication unit 336 of FIG. 3 receiving the command 403 to perform the guidance function 216. The first software 326 or the second software 342 can provide the intelligence for the interface module 406.

The navigation system 100 further depicts a guidance module 408, which can perform the guidance function 216 based on the information segment 214. For example the guidance module 408 can perform the guidance function 216 such as a navigation function, application, or service or a non-navigation function, application or service. The guidance module 408 can, for example, provide a navigation function such as providing turn-by-turn navigation to the destination 222 parsed from and extracted from the information segment 214. For example, the guidance module 408 can provide turn-by-turn navigation to the destination 222 mentioned in an advertisement and captured in the information segment 214.

If, for example, the information segment 214 includes location information, such as an address of the destination 222, then the guidance module 408 can provide turn-by-turn navigation to the address from the user location 220 of FIG. 2. If the information segment 214, however, only includes the name of the destination 222, such as "Burger Restaurant," with no other location information, then the guidance module 408 can determine the destination 222, in this case "Burger Restaurant," closest to the user location 220 and provide turn-by-turn navigation to the destination 222.

Also, for example, the guidance module 408 can perform the guidance function 216 by performing a non-navigation function based on the information segment 214, such as calling a phone number mentioned in an advertisement and captured in the information segment 214. If the information segment 214 only includes the name of a store, such as "Burger Restaurant," but no phone number, then the guidance module 408 can determine the phone number of the "Burger Restaurant" closest to the user location 220 and can call that number.

As a further example, the guidance module 408 can perform the guidance function 216 based on the information segment 214 by ordering a product mentioned in an advertisement or news story, purchasing movie tickets for a movie mentioned in an advertisement or news story, or purchasing a song played on the radio, on television or on the internet.

The guidance module 408 can be implemented, for example, by the first device 102, the second device 106, or distributed between the two. For example, the guidance module 408 can be implemented by the location unit 320 of FIG. 3 determining the user location 220 of FIG. 2. The first control unit 312 or the second control unit 334 can perform the guidance function 216 such as providing turn-by-turn navigation to a location, such as the destination 222 or dialing a phone number of the destination 222. The first software 326 or the second software 342 can provide the intelligence for the guidance module 408.

The navigation system 100 further depicts a tracking module 410, which tracks the number of times the guidance function 216 is performed based on the information segment 214. The tracking module 410 can also track the number of times the user replays, downloads, or accesses the audio source 208, the audio segment 210, or the text segment 212. As an example the tracking module 410 can track the number of times the user navigates to the destination 222 mentioned in the information segment 214, calls a number based on the information segment 214, purchases a product from the information segment 214, or makes a call based the information segment 214 that ends in a purchase.

As a further example, the tracking module 410 can track how many times the user replays, downloads, or accesses the audio source 208, the audio segment 210, or the text segment 212. This tracking information can be sent to an interested party such as a broadcaster, a navigation system manufacturer, or a vendor.

The tracking module 410 can also calculate an activity impression 416 based on the number of times the guidance function 216 is performed as a response to the information segment 214. The activity impression 416 is defined as a count of predetermined types of activities by a user of the navigation system 100 in relation to the audio source 208 being monitored by the navigation system 100.

The tracking module 410 can determine if a user action 412 is a response resulting from the information segment 214 extracted from the audio segment 210 in a number of ways. The user action 412 is defined as a response by a user of the navigation system 100 where the response involves information from the audio source 208, the audio segment 210, the text segment 212, the information segment 214, or a combination thereof.

For example, the tracking module 410 can determine the user action 412 is a response caused by the information segment 214 if the user action 412 or the response is below a predetermined time 414 from the transmission of the audio segment 210 or the audio source 208. The predetermined time 414 is used to determine whether the response is categorized as immediate and very high probability the response is a result of the information segment 214 or not. The predetermined time 414 can be set to a maximum value of 5 minutes, as an example, whereby if the information segment 214 is accessed to invoke an action using the information segment 214, then the action is deemed as an immediate action and can be considered a result of the information segment 214 from the audio segment 210.

The tracking module 410 can also determine whether the user action 412 is a response caused by the information segment 214 even if the response is beyond the predetermined time 414 from the transmission of the audio segment 210 from the audio source 208. For example, the audio segment 210, the text segment 212, the information segment 214, or a combination thereof can be stored away without the user acting upon it for a time beyond the predetermined time 414. In this case, the tracking module 410 can still determine that the user action 412 is a response to the audio segment 210, the text segment 212, or the information segment 214 that have been stored away if the user invokes the retrieval of such information to perform the action using the information segment 214.

The tracking module 410 can utilize the activity impression 416 to measure effectiveness of the audio source 208 in regards of reaching is targeted audience. The tracking module 410 can calculate a fee based on the activity impression 416, which can include the number of times a user replays downloads, or accesses the audio source 208, the audio segment 210, or the text segment 212.

For example every time the user attempts to navigate to the destination 222 mentioned in the information segment 214, call a number based on the information segment 214, purchase a product from the information segment 214, or makes a call based the information segment 214 that ends in a purchase, the tracking module 410 can determine whether or not an interested party such as the broadcaster, the manufacturer of the navigation system 100, or the vendor has assigned a fee for such an action. If there is a fee for such an action the tracking module 410 can calculate the amount to be charged to the user and can communicate that amount to the user or can debit that amount from a user account.

The tracking module 410 can be implemented, for example, by the first device 102, the second device 106, or distributed between the two. The tracking module 410 can be implemented, for example, by the first control unit 312 or the second control unit 334 determining if the guidance function 216 has a fee assigned to it and calculating that fee. The communication unit 316 of or the second communication unit 336 can send tracking information or information regarding the fee charged to the interested party. The first software 326 or the second software 342 can provide the intelligence for the tracking module 410.

It has been discovered that the navigation system 100 can allow an interested party, such as a broadcaster, navigation system manufacturer, or vendor to monitor the usage of broadcast information. The navigation system 100 can allow an interested party to monitor usage of broadcast information by tracking how many times the guidance function 216 is performed based on the information segment 214 or how many times the audio source 208, the audio segment 210, or the text segment 212 is accessed, replayed, or downloaded. Furthermore the navigation system 100 allows an interested party to monetize interactions with broadcast information by tracking each interaction with the broadcast information, such as performing the guidance function 216 based on the information segment 214, and calculating a fee for that interaction.

The navigation system 100 describes the module functions or order as an example. The modules can be partitioned differently. For example the monitoring module 402 can perform the functions of the tracking module 410 or the parsing module 404 can perform the functions of the tracking module 410 or vice versa. Each of the modules can operate individually and independently of the other modules.

The physical transformation of location information, route information, audio information, information navigation information, and navigation or non-navigation applications, services or products results in movement in the physical world, such as people or vehicles using the navigation system with audio monitoring, based on the operation of the navigation system. As the movement in the physical world occurs, the movement itself creates additional information that is converted back to the user location information, route information, audio information, navigation information, and navigation or non-navigation applications, services or products for the continued operation of the navigation system and to continue the movement in the physical world.

It has been discovered that the navigation system of the present invention furnishes important and heretofore unknown and unavailable solutions, capabilities, and functional aspects for providing audio monitoring.

Figure 5:
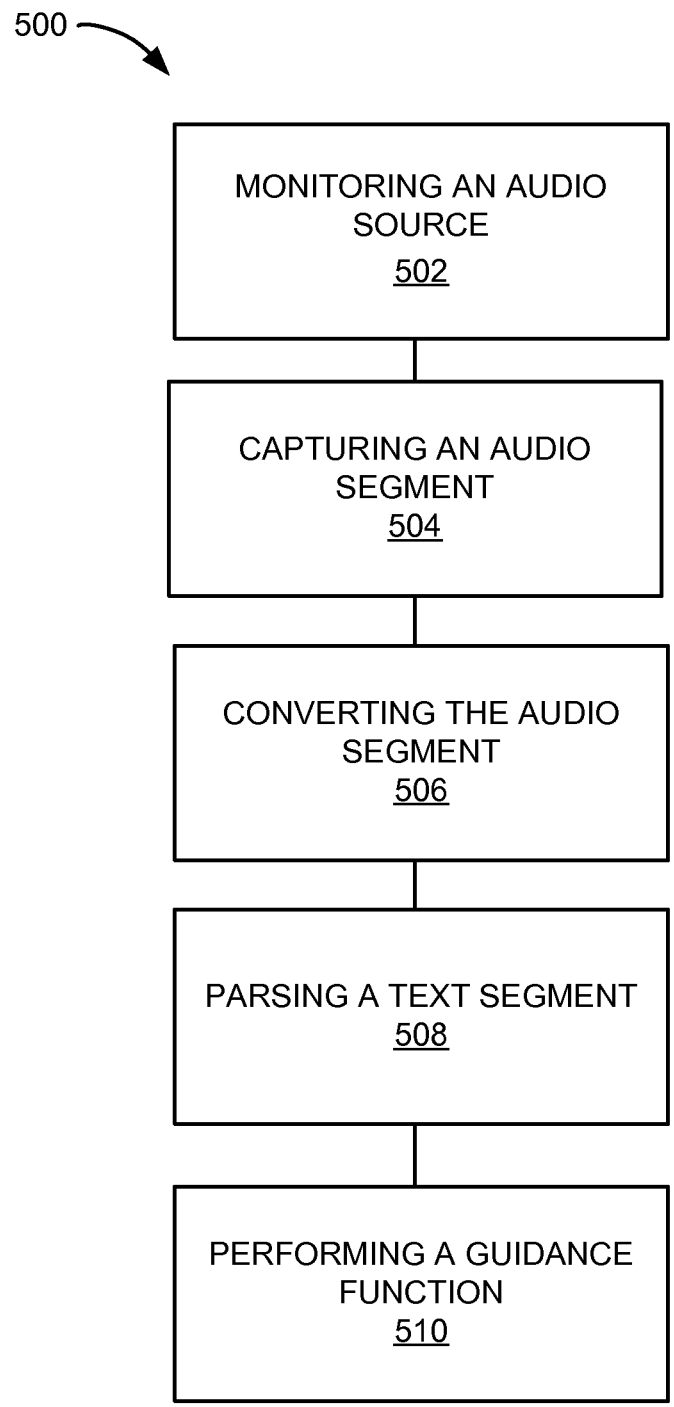
FIG. 5 is a flow chart of a method of operation of a navigation system in a further embodiment of the present invention.

Referring now to FIG. 5, therein is shown a flow chart of a method of operation of a navigation system in a further embodiment of the present invention. A method 500 includes: monitoring an audio source in a block 502; capturing an audio segment from the audio source in a block 504; converting the audio segment into a text segment in a block 506; parsing the text segment for an information segment in a block 508; and performing a guidance function based on the information segment for displaying on a device in a block 510.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing navigation systems fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   monitoring an audio source for communicating a broadcast transmission from radio, television, or the internet;
   capturing an audio segment from the audio source for capturing a portion of the broadcast transmission based on a command from a user;
   converting the audio segment into a text segment with a control unit implemented as hardware;
   parsing the text segment for an information segment for estimating an act of the user in response to the broadcast transmission; and
   performing a guidance function based on the information segment for displaying on a device.

2. The method as claimed in claim 1 wherein monitoring the audio source includes selecting a predetermined locality of the audio source.

3. The method as claimed in claim 1 wherein performing the guidance function includes determining a destination based on the information segment closest to a user location.

4. The method as claimed in claim 1 wherein capturing the audio segment includes capturing the audio segment based on the time at which the audio segment was broadcast and a frequency on which the audio segment was broadcast.

5. The method as claimed in claim 1 further comprising determining a user action as a response caused by the information segment when the user action is below a predetermined time from the transmission of the audio source.

6. A method of operation of a navigation system comprising:
   monitoring an audio source for communicating a broadcast transmission from radio, television, or the internet;
   capturing an audio segment from the audio source for capturing a portion of the broadcast transmission based on a command from a user;
   converting the audio segment into a text segment with a control unit implemented as hardware;
   parsing the text segment for an information segment for estimating an act of the user in response to the broadcast transmission;
   performing a guidance function based on the information segment for displaying on a device; and
   tracking the guidance function,
   determining the number of times the guidance function is performed as a response to the information segment.

7. The method as claimed in claim 6 wherein monitoring the audio source includes receiving the command to begin monitoring the audio source.

8. The method as claimed in claim 6 wherein monitoring the audio source includes monitoring the audio source in background mode.

9. The method as claimed in claim 6 further comprising determining a user action as a response caused by the information segment when the user action is beyond a predetermined time from the transmission of the audio source.

10. The method as claimed in claim 6 wherein tracking the guidance function includes calculating an activity impression for the guidance function.

11. A navigation system comprising:
    a communications unit for monitoring an audio source for communicating a broadcast transmission from radio, television, or the internet;
    a storage unit, coupled to the communications unit, for capturing an audio segment from the audio source for capturing a portion of the broadcast transmission based on a command from a user; and
    a control unit implemented as hardware, coupled to the communications unit, for:
      converting the audio segment into a text segment,
      parsing the text segment for an information segment for estimating an act of the user in response to the broadcast transmission, and
      performing a guidance function based on the information segment.

12. The system as claimed in claim 11 wherein the control unit is for selecting a predetermined locality of the audio source.

13. The system as claimed in claim 11 wherein the control unit is for determining the destination based on the information segment closest to a user location.

14. The system as claimed in claim 11 wherein the storage unit is for capturing the audio segment based on the time at which the audio segment was broadcast and frequency on which the audio segment was broadcast.

15. The system as claimed in claim 11 wherein the control unit is for determining a user action as a response caused by the information segment when the user action is below a predetermined time from the transmission of the audio source.

16. The system as claimed in claim 11 wherein the control unit is for tracking the guidance function.

17. The system as claimed in claim 16 wherein the communications unit is for receiving the command to begin monitoring the audio source.

18. The system as claimed in claim 16 wherein the communications unit is for monitoring the audio source in background mode.

19. The system as claimed in claim 16 the control unit is for determining a user action as a response caused by the information segment when the user action is beyond a predetermined time from the transmission of the audio source.

20. The system as claimed in claim 16 wherein the control unit is for calculating an activity impression for the guidance function.

* * * * *